Oct. 25, 1966  T. J. O'CONNOR  3,281,343
METHOD OF MACHINING
Filed June 10, 1963  2 Sheets-Sheet 1

INVENTOR.
THOMAS J. O'CONNOR
BY Whittemore
Hulbert & Belknap
ATTORNEYS

Oct. 25, 1966 T. J. O'CONNOR 3,281,343
METHOD OF MACHINING
Filed June 10, 1963 2 Sheets-Sheet 2

INVENTOR.
THOMAS J. O'CONNOR
BY *Whittemore*
*Hulbert & Belknap*
ATTORNEYS 3,281,343
METHOD OF MACHINING
Thomas J. O'Connor, 100 Morgan Road,
Ann Arbor, Mich.
Filed June 10, 1963, Ser. No. 286,687
3 Claims. (Cl. 204—143)

The invention relates to working of material which is an electrical conductor and refers more specifically to a method of and means for producing accurately aligned holes or cavities in a metal workpiece by electrical discharge or electro-chemical machining.

In the past the accurate aligning of holes and cavities such as is required to provide die lands and dies having back clearance has been difficult in that separate tools have been required to be accurately aligned often with cavities on opposite sides of a workpiece. Even where holes or cavities have been produced from the same side of a workpiece, a great deal of time has been spent in the past in producing and aligning tools for producing the openings or cavities.

It is therefore one of the objects of the present invention to provide an improved method of producing accurately aligned openings or cavities in a workpiece.

Another object is to provide improved means for producing accurately aligned openings or cavities in a workpiece.

Another object is to provide a method of producing aligned cavities or openings in a workpiece comprising securing a punch holding plate, a punch thereon, a die plate, an electrode holding plate and an electrode between two die set members which are insulated from each other, drilling dowel pin holes through the die set, electrode holding plate and punch holding plate, securing the electrode to the punch, securing the punch holding plate with the punch and electrode secured thereto and the electrode holding plate in position on the die set members by means of dowel pins in the dowel pin holes therein, securing the electrode to the electrode holding plate while the punch holding plate carrying the punch and electrode and the electrode holding plate are aligned, cutting the electrode in two transversely and electrical discharge or electro-chemical machining the die plate from opposite sides with the die plate secured to one member of the die set with dowel pins extending through the aligned dowel pin holes and with one part of the electrode secured to the other member of the die set with dowel pins extending through aligned dowel pin holes.

Another object is to provide a method as set forth above and further including providing a manifold between the one member of the die set and the die plate and passing a dielectric or electrolyte and coolant fluid through the die set during machining.

Another object is to provide a method as set forth above and further including machining the electrode with the punch.

Another object is to provide a structure for producing aligned openings or cavities in a workpiece comprising a die set, a manifold secured to one member of the die set, a die plate secured to the manifold, an electrode holding plate secured to the other member of the die set, an electrode secured to the electrode holding plate, exactly aligned dowel pin holes extending through the die set members, manifold, die plate and electrode holding plate, and dowel pins in said dowel holes holding the die set, manifold, die plate and electrode holding plate with the electrode in predetermined alignment.

Another object is to provide structures for producing accurately aligned openings or cavities in a die plate comprising a die set, a punch holding plate secured to one member of the die set, a punch secured to the punch holding plate, an electrode secured to the punch, a manifold secured to the other member of said die set and a die plate secured to said manifold, each of the die set members, punch holding plate, die plate and manifold having aligned dowel openings extending therethrough and dowel pins extending through said openings maintaining said die set members, punch holding plate, die plate and manifold in predetermined alignment.

Another object is to provide a method of and apparatus for producing aligned openings or cavities in a workpiece which is simple, economical and efficient.

Other objects and features of the invention will become apparent as the description proceeds, especially when taken in conjunction with the accompanying drawings illustrating a preferred embodiment of the invention, wherein.

With particular reference to the figures of the drawings, the method of and a structure for producing aligned openings or cavities in a die plate 12 in accordance with the invention will be disclosed in detail.

Figure 1:
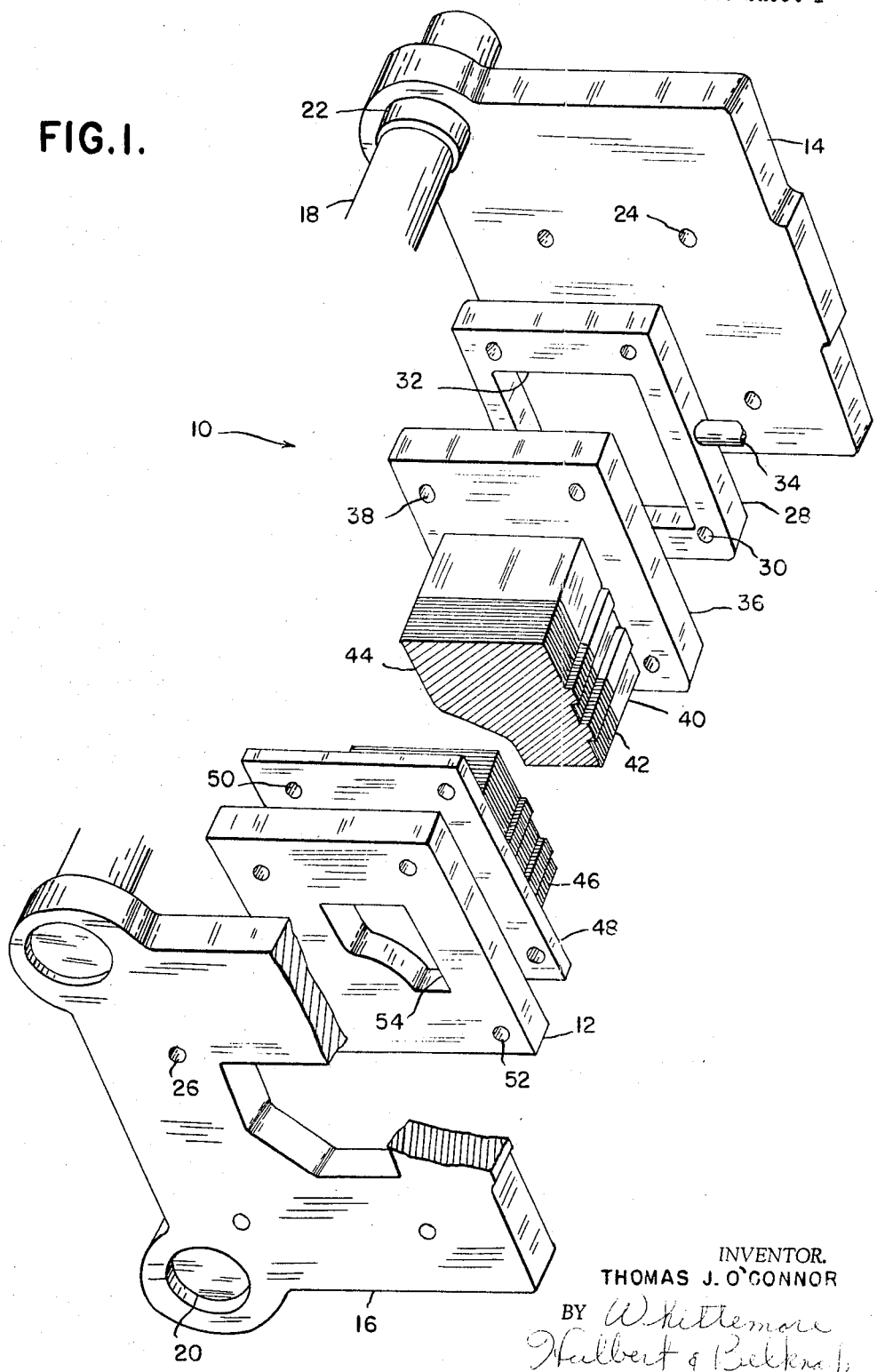
FIGURE 1 is an exploded perspective view of structure constructed in accordance with the invention.

The structure 10, as best shown in FIGURE 1, comprises a die set including a top member 14 slidably supported on the posts 18 and 20 and a bottom member 16. Posts 18 and 20 are insulated from each other and from the die set members 14 and 16 by the insulating bushings 22. Aligned dowel pin holes 24 and 26 are provided extending through the die set halves as illustrated.

Structure 10 further includes the manifold 28 having dowel pin holes 30 therein which are aligned with the dowel pin holes 24 and 26 in the die set members. Manifold 28 is provided with the opening 32 extending therethrough into which a coolant such as an electrical discharge machine dielectric or an electro-chemical machine electrolyte is fed through conduit 34 from a source (not shown). In operation of structure 10 a dielectric or electrolyte is provided for passage through the manifold 28 and between the electrode parts 42 and 46 and the die plate 12.

Punch holding plate 36 is provided with the dowel pin holes 38 aligned with the dowel pin holes 24 and 26 in the die set members and the dowel pin holes 30 in the manifold 28. The punch 40 is secured to the punch holding plate 36 by convenient means, such as cement, solder, or screws.

As shown in FIGURE 1 the part 42 of the electrode 44 is secured to the punch 40 by convenient means, such as cement, and it is in fact machined to the desired punch shape with the punch so that accuracy of the electrode shape is assured. The electrode part 46 is secured to the electrode holding plate 48 also by convenient means, such as cement and solder or screws.

Dowel pin holes 50 are provided in the electrode holding plate 48, as shown, and are in alignment with the dowel pin holes 24 and 26, 30 and 38. The electrode part 46 has been machined to the shape of the punch 40 along with the electrode part 42 before separation of the parts 42 and 46, as will be considered subsequently.

The die plate 12, as shown best in FIGURE 1, may be of hard or soft material such as metal which is capable of conducting electricity. The die plate is provided with dowel pin holes 52 therein aligned with dowel pin holes 24, 26, 30, 38 and 50 and may have a roughed out shape 54 therein or not as desired.

Figure 2:
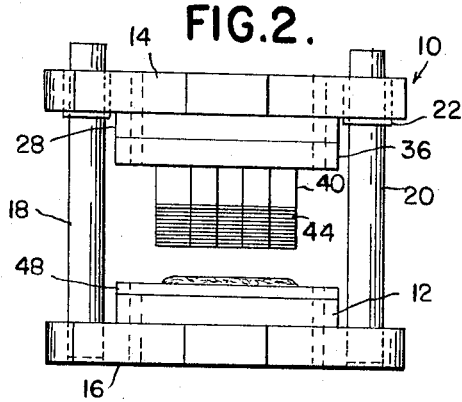
FIGURE 2 is an elevation view of the structure illustrated in FIGURE 1 showing the electrode before it is secured to the electrode holding plate.
Figure 3:
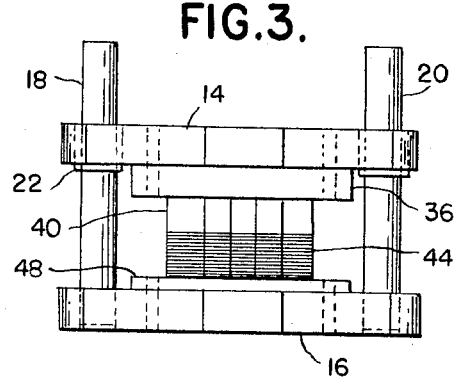
FIGURE 3 is an elevation view of the structure illustrated in FIGURE 1 showing the electrode secured to the electrode holding plate.

In using the structure 10 to produce, for example, aligned openings in opposite sides of the die plate 12 in accordance with the method of the invention, the die set members 14 and 16, the manifold 28, punch holding plate 36, punch 40, electrode 44 before it is separated into the two parts 42 and 46, the electrode holding plate 48 and the die plate 12 are held in assembled relation on the posts 18 and 20, as illustrated in FIGURE 2. The aligned dowel pin openings 24, 26, 30, 38, 50 and 52 are formed in the die members, manifold, punch holding plate, electrode holding plate and die plate by convenient means, such as drilling and boring or reaming.

The electrode 44 is secured to the punch 40 and the punch 40 together with the electrode 44 is machined to the desired configuration of punch 40. The punch holding plate 36, punch 40 and electrode 44 which are secured together by convenient means, such as cement, solder or screws (not shown) are mounted on the die set part 14 while the electrode holding plate 48 is mounted on the die set part 16 both by means of dowel pins (not shown) extending through the dowel pin holes therein.

With the electrode 44 and the electrode holding plate 48 so secured to the die set members 14 and 16, as shown in FIGURE 2, the electrode 44 is secured to the electrode holding plate by convenient means such as cement. The electrode 44 is then cut into the two parts 42 and 46 which have mirror image surfaces and which will be exactly aligned with each other when the punch holding plate 36 and the electrode holding plate 48 are assembled with the die set members 14 and 16 by means of dowels extending through the dowel pin holes, as illustrated in FIGURE 4.

Figure 4:
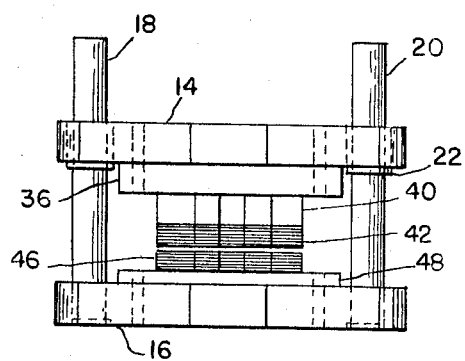
FIGURE 4 is an elevation view of the structure illustrated in FIGURE 1 showing the electrode cut in two with a portion of the electrode secured to the punch and a portion of the electrode secured to the electrode holding plate.
Figure 5:
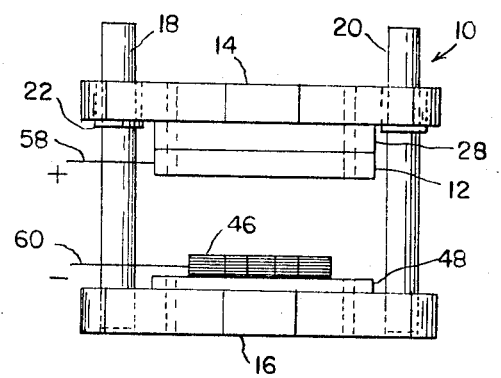
FIGURE 5 is an elevation view of part of the structure illustrated in FIGURE 1 for machining the bottom of the die plate.
Figure 6:
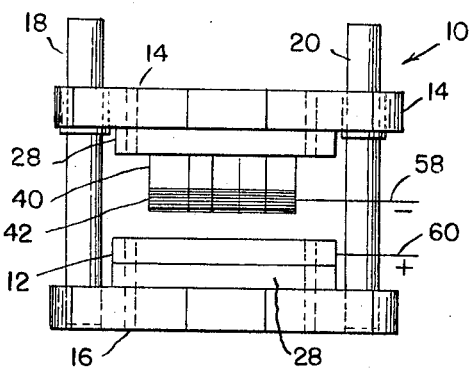
FIGURE 6 is an elevation view of part of the structure illustrated in FIGURE 1 for machining the top of the die plate.

Accurately located openings or recesses in the opposite sides of the die plate 12 are then produced on assembling of the die set members 14 and 16 on the posts 18 and 20 and locating the manifold 28, die plate 12 and either the electrode part 46 and electrode holding plate 48, or the electrode part 42, punch 40 and punch holding plate 36 on the die set members 14 and 16, as shown in FIGURES 5 and 6, by means of dowel pins extending through the dowel pin holes therein and proceeding with the usual electrical discharge machining with a dielectric passed through the manifold 28 between the die plate 12 and electrode part 42 or 46 or with the usual electro-chemical machining with an electrolyte passed through manifold 28 between the die plate 12 and the electrode part 42 or 46 and an electric potential provided between the electrode part and die plate as indicated by conductors 58 and 60 in FIGURES 4 and 5.

Thus it will be seen that with the structure 10 exactly aligned holes or cavities may be produced in a die plate in accordance with the method outlined above. Further it will be obvious that due to the machining of the electrode 44 with the punch 40 and the provision of pre-aligned dowel holes 24, 26, 30, 38, 50 and 52, tedious time consuming and often inaccurate aligning of the electrode parts 42 and 46 and holes or cavities produced thereby is eliminated.

The adaptability of the structure 10 and the method of use thereof as set forth above to produce die plates in which back clearance is required and to sink aligned die lands will be readily appreciated by skilled mechanics.

While one embodiment of the present invention has been considered in detail, other embodiments and modifications are contemplated. For example, while a manifold 28 has been illustrated, it will be understood that the electrolyte or the dielectric could be provided in other ways such as providing a manifold around the entire apparatus 10 containing the electrolyte or dielectric material. It is the intention to include all modifications and embodiments of the invention that are defined by the appended claims within the scope of the invention.

What I claim as my invention is:

1. A method of producing aligned openings and cavities from opposite sides of a workpiece comprising securing the workpiece, a punch and punch carrying member, an electrode and an electrode carrying member between the members of a die set forming aligned dowel holes through the die set members, punch carrying member, electrode carrying member and workpiece, securing the electrode to the punch, securing the electrode to the electrode carrying member, cutting the electrode in two transversely, securing one part of the electrode and the member carrying it to one member of the die set, securing the workpiece to the other member of the die set, aligning the die set, electrode part carrying member and workpiece by means of dowel pins extending through said dowel pin holes and advancing the electrode part toward the workpiece in a machining operation and subsequently securing the workpiece to the one die set member and the other electrode part carrying member to the other member of the die set, aligning the workpiece, die set members and other electrode part carrying member by means of dowel pins extending through the dowel pin holes and advancing the other electrode part toward the workpiece in a machining operation.

2. The method as claimed in claim 1 and further including the step of machining the electrode with the punch.

3. A method of producing aligned openings and cavities from opposite sides of a workpiece comprising securing the workpiece, a manifold, a punch and punch carrying member, an electrode and an electrode carrying member between the members of a die set, forming aligned dowel holes through the die set members, manifold, punch carrying member, electrode carrying member and workpiece, securing the electrode to the punch, securing the electrode to the electrode carrying member, cutting the electrode in two transversely, securing one part of the electrode and the member carrying it to one member of the die set, securing the manifold and workpiece to the other member of the die set, aligning the die set, electrode part carrying member, manifold and workpiece by means of dowel pins extending through said dowel pin holes and advancing the electrode part toward the workpiece in a machining operation and subsequently securing the manifold and workpiece to the one die set member and the other electrode part carrying member to the other member of the die set, aligning the manifold, workpiece, die set members and other electrode carrying member by means of dowel pins extending through the dowel pin holes and advancing the other electrode part toward the workpiece in a machining operation.

References Cited by the Examiner
UNITED STATES PATENTS

| | | | |
|---|---|---|---|
| 2,800,566 | 7/1957 | Matulaitis | 219—69 |
| 2,816,461 | 12/1957 | Oefinger | 76—107 |
| 2,927,190 | 3/1960 | Dulebohn | 219—69 |

JOHN H. MACK, *Primary Examiner.*

R. K. MIHALEK, *Assistant Examiner.*